US008935270B1

(12) United States Patent
Estan et al.

(10) Patent No.: US 8,935,270 B1
(45) Date of Patent: Jan. 13, 2015

(54) CONTENT SEARCH SYSTEM INCLUDING MULTIPLE DETERMINISTIC FINITE AUTOMATON ENGINES HAVING SHARED MEMORY RESOURCES

(75) Inventors: Cristian Estan, Sunnyvale, CA (US); Greg Watson, Palo Alto, CA (US)

(73) Assignee: Netlogic Microsystems, Inc., Irvine, CA (US)

( * ) Notice: Subject to any disclaimer, the term of this patent is extended or adjusted under 35 U.S.C. 154(b) by 594 days.

(21) Appl. No.: 12/779,894

(22) Filed: May 13, 2010

(51) Int. Cl.
*G06F 7/00* (2006.01)
*G06F 17/30* (2006.01)

(52) U.S. Cl.
USPC ........................................................ 707/758

(58) Field of Classification Search
USPC ...................................................... 706/48, 47
See application file for complete search history.

(56) References Cited

U.S. PATENT DOCUMENTS

| | | | |
|---|---|---|---|
| 6,952,756 B1 * | 10/2005 | Le ................................ | 711/154 |
| 7,299,282 B2 * | 11/2007 | Sarkissian et al. ............ | 709/224 |
| 7,353,332 B2 | 4/2008 | Miller ........................... | 711/108 |
| 7,440,304 B1 | 10/2008 | Raj ............................... | 365/49.1 |
| 7,529,746 B2 | 5/2009 | Ichiriu et al. .................. | 707/5 |
| 7,539,031 B2 | 5/2009 | Ninan et al. .................. | 365/49.1 |
| 7,539,032 B2 | 5/2009 | Ichiriu et al. ................. | 365/49.1 |
| 7,624,105 B2 | 11/2009 | Ichiriu et al. ................. | 707/4 |
| 7,634,500 B1 | 12/2009 | Raj ............................... | 707/104.1 |
| 7,643,353 B1 | 1/2010 | Srinivasan et al. ........... | 365/49.17 |
| 7,644,080 B2 | 1/2010 | Mammen et al. ............. | 707/6 |
| 7,656,716 B1 | 2/2010 | Srinivasan et al. ........... | 365/49.17 |
| 7,660,140 B1 | 2/2010 | Joshi et al. .................... | 365/49.17 |
| 7,676,444 B1 * | 3/2010 | Venkatachary et al. ....... | 706/48 |
| 7,783,654 B1 | 8/2010 | Sreenath ........................ | 707/6 |
| 7,787,275 B1 | 8/2010 | Birman et al. ................ | 365/49.1 |
| 7,805,392 B1 * | 9/2010 | Steele et al. ................... | 706/48 |
| 7,859,877 B2 | 12/2010 | Mondaeev | |
| 2008/0140662 A1 * | 6/2008 | Pandya .......................... | 707/6 |
| 2009/0106183 A1 * | 4/2009 | Estan et al. ................... | 706/48 |
| 2010/0054012 A1 | 3/2010 | Srinivasan et al. ........... | 365/49.17 |
| 2010/0054013 A1 | 3/2010 | Joshi et al. ................... | 365/49.17 |
| 2010/0088756 A1 * | 4/2010 | Balakrishnan et al. ....... | 726/13 |

OTHER PUBLICATIONS

Luchaup, D. et al., "Multi-byte Regular Expression Matching with Speculation," *RAID '09 Proceedings of the 12th International Symposium on Recent Advances in Intrusion Detection*, pp. 284-303, ISBN: 978-3-642-04341-3, Copyright 1999.

* cited by examiner

*Primary Examiner* — Uyen Le
(74) *Attorney, Agent, or Firm* — Sterne, Kessler, Goldstein & Fox P.L.L.C (57) ABSTRACT

A content search system for determining whether an input string matches one or more of a number of patterns embodied by a deterministic finite automaton (DFA) includes a plurality of DFA engines that simultaneously compare sequential overlapping segments of the input string. The overlap region shared by adjacent pairs of input string segments is of a predetermined size. Initially, the first DFA engine is designated as the master engine, and the remaining DFA engines are designated as slave engines whose state results are speculative. Resolution logic compares the state results of the master engine with the state results of the adjacent slave engine to selectively validate the state results of the successor engine, which upon validation becomes the new master engine.

20 Claims, 8 Drawing Sheets

FIG. 5B

CONTENT SEARCH SYSTEM INCLUDING MULTIPLE DETERMINISTIC FINITE AUTOMATON ENGINES HAVING SHARED MEMORY RESOURCES

FIELD OF INVENTION

This invention generally relates to the field of content search systems, and specifically relates to a search system having a plurality of deterministic finite automaton engines operating on different portions of an input string in parallel.

BACKGROUND OF RELATED ART

Pattern matching algorithms, which detect the occurrence of a pattern in an input string of characters, are widely used in information retrieval applications (e.g., data mining, bibliographic searching, search and replace text editing, and word processing) and in content inspection applications (e.g., network intrusion detection systems, virus/worm detection using signature matching, IP address lookup in network routers, and DNA sequence matching).

For many applications, it is necessary to search an input string for multiple patterns. A conventional multi-pattern matching algorithm is the Aho-Corasick (AC) algorithm. The AC algorithm locates all occurrences of a number of patterns in an input string by constructing a finite state machine that embodies the patterns. For example, this algorithm can be used to detect virus/worm signatures in a data packet stream by running the data packet stream through the finite state machine character by character (e.g., byte by byte).

The AC algorithm constructs the finite state machine in three pre-processing stages commonly referred to as the goto stage, the failure stage, and the next stage. In the goto stage, a deterministic finite state automaton (DFA) or search trie is constructed for a given set of patterns. The DFA constructed in the goto stage includes various states for an input string, and transitions between the states based on characters of the input string. Each transition between states in the DFA is based on a single character of the input string. The failure and next stages add additional transitions between the states of the DFA to ensure that a string of length n can be searched in exactly n cycles. More specifically, the failure and next transitions allow the state machine to transition from one branch of the tree to another branch that is the next best (i.e., the longest prefix) match in the DFA. Once the pre-processing stages have been performed, the DFA can then be used to search any target for all of the patterns in the pattern set.

During the search stage, the AC DFA processes one character or byte at a time (e.g., in a serial fashion), and each state transition is stored in a memory. Accordingly, the AC DFA transitions to a different state based on each character of the input string. Thus, for each character in an input string, a memory lookup operation is performed to access the goto transitions from the current state of the AC DFA, which are then compared with the input character to determine the next state.

Content inspection systems deployed in a network need to detect the presence of multiple signatures in an input stream of packets at network line speeds. As network line speeds increase, conventional search engines employing the AC DFA technique are becoming increasingly insufficient to perform searches at line speeds because a memory lookup operation is typically performed for each character of the input string.

In an article entitled "Multi-Byte Regular Expression Matching with Speculation" authored by Daniel Luchaup et al, the authors propose searching an input string for regular expressions using multiple DFA engines in parallel with speculation. For example, in a search circuit having two DFA engines, the input string is divided into two non-overlapping portions or "chunks," and the first and second chunks are processed in parallel by the first and second DFA engines, respectively. While the start state of the first DFA engine is known, the start state of the second DFA engine (which should be the final state of the first DFA engine) is not initially known, and is speculatively set to the initial DFA state. More specifically, the first and second DFA engines process their respective input chunks in parallel during a parallel processing stage until the first DFA engine completes processing the first chunk. Then, during a validation stage, the first DFA engine starts processing the second chunk and, for each character of the second chunk, compares the active state of the first DFA engine with the state previously reached by the second DFA engine until a match is found, at which point the first and second DFA engines are said to be in agreement and the states speculated by the second DFA engine are validated.

Although effective in improving the average processing speed of AC DFA search systems, the system disclosed by Luchaup et al cannot guarantee how many characters of the second input chunk need to be processed by the first DFA engine to achieve validation, and thus undesirably lacks predictability. In addition, the inability to predict with certainty how many iterations the validation stage requires to resolve speculation means that although the average processing speed is improved, the worst-case processing speed is not improved over search systems having a single DFA engine.

Thus, there is a need for an improved DFA speculative search system that can guarantee improvement in the worst-case processing speed and provide more behavior predictability.

BRIEF DESCRIPTION OF THE DRAWINGS

The present embodiments are illustrated by way of example and not intended to be limited by the figures of the accompanying drawings, where.

Like reference numerals refer to corresponding parts throughout the drawing figures.

DETAILED DESCRIPTION

In the following description, numerous specific details are set forth such as examples of specific, components, circuits, and processes to provide a thorough understanding of the present invention. It will be apparent, however, to one skilled in the art that these specific details need not be employed to practice the present invention. In other instances, well known components or methods have not been described in detail in order to avoid unnecessarily obscuring the present invention. As used herein, the terms "search tree" and "state graph" refer to state machines that embody one or more signatures to be searched for in an input string during string search operations, and are thus interchangeable. Further, the term "success transition," which refers herein to a goto transition from a current state to a next state in a search tree, is also commonly referred to as a "success edge." Further, although described below in the context of an SRAM-based AC search system, the present embodiments are equally applicable to TCAM-based or other suitable search systems.

Figure 1:
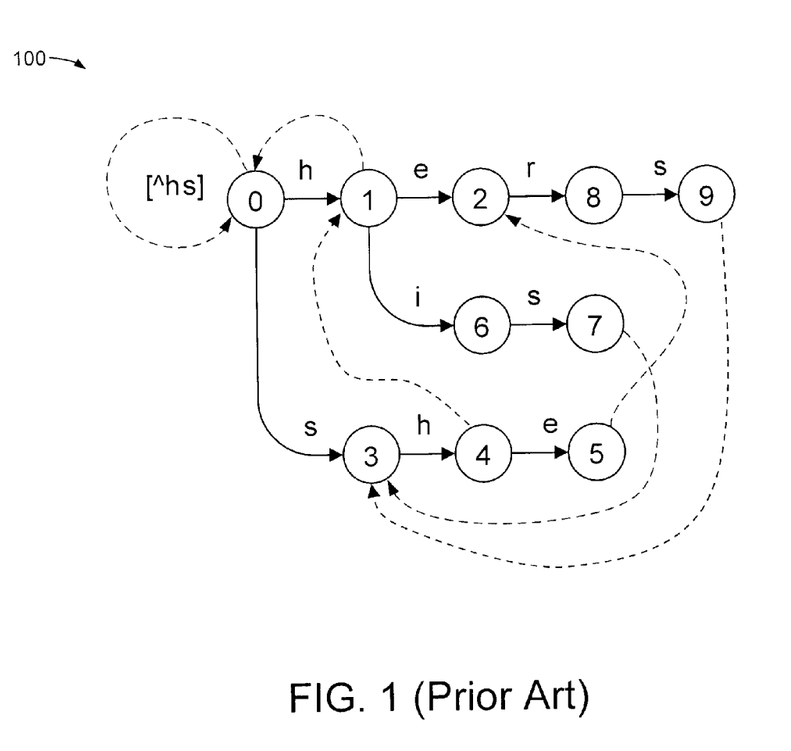
FIG. 1 shows a Determininistic Finite Automaton (DFA) configured to search an input string for the patterns {he, she, his, hers} according to the Aho-Corasick algorithm.

Many content search operations are performed using a deterministic finite automaton (DFA). For example, FIG. 1 illustrates a goto-failure state graph 100 that embodies a search operation for the strings {he, she, his, hers} according to the well-known Aho-Corasick (AC) state machine. Search operations between an input string and the strings or signatures {he, she, his, hers} begin at the root state (state 0), at which the first input character is compared with the two goto transitions "h" and "s" originating at state 0. If there is a match, then the matching goto transition is taken to the next state. Each of the goto transitions is depicted as a solid line extending from the previous state to the next state, and is accompanied by the character value or "edge" that enables the goto transition to the next state. For example, if the first input character is an "h," then the "h" goto transition is taken to state 1, and then the next input character is compared with the corresponding goto transitions "e" and "i" originating at state 1.

If there is not a match between the current input character and any of the success edges associated with the current state, then a failure transition is taken to a fail state. The failure transitions are depicted as dotted lines in FIG. 1. Although not shown for simplicity, each of states 2, 3, 6, and 8 includes a failure transition to the root state. For example, if the current input character examined at state 1 is not an "e" or an "i," then the failure transition is taken from state 1 to the root state. Some of the failure transitions terminate at states other than the root state because a portion of another string has already been matched. For example, if the current input character examined at state 4 is not an "e," the failure transition is taken to state 1 because the "h" edge to state 1 has already been matched. In addition, states 2, 5, 7, and 9 are designated as output states because if any of those states is reached, at least one of the signatures has been matched by the input string, and an output code indicating the matching signature may be provided.

Figure 2A:
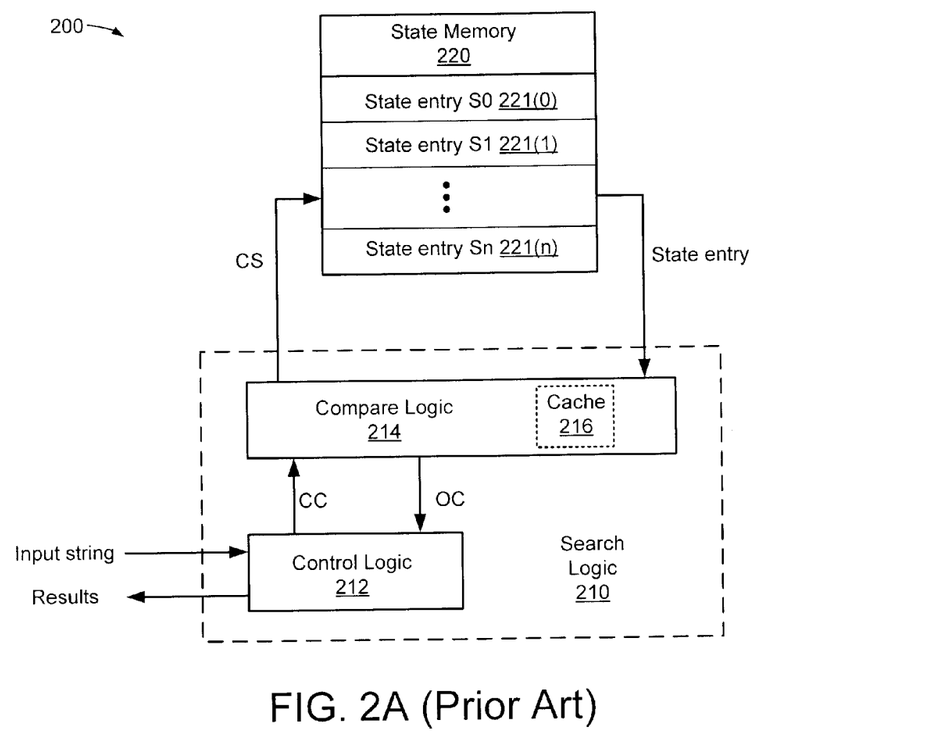
FIG. 2A shows a well-known search engine configured to perform string searches using DFA's of the type shown in FIG. 1.

FIG. 2A shows a search engine 200 that can perform search operations according to state machines of the type described above with respect to FIG. 1. Search engine 200 includes search logic 210 coupled to a state memory 220. State memory 220, which may be any suitable type of random addressable memory (RAM) device (e.g., an SRAM, DRAM, EEPROM, or Flash Memory device), includes a plurality of storage locations 221(0)-221(n) for storing state information of a search tree. For simplicity, each storage location 221 of state memory 220 is depicted in FIG. 2A as storing the state entry for a corresponding one of states S0-Sn of a search tree to be searched, although it is noted that some state entries may require more than one row in state memory 220.

Figure 2B:
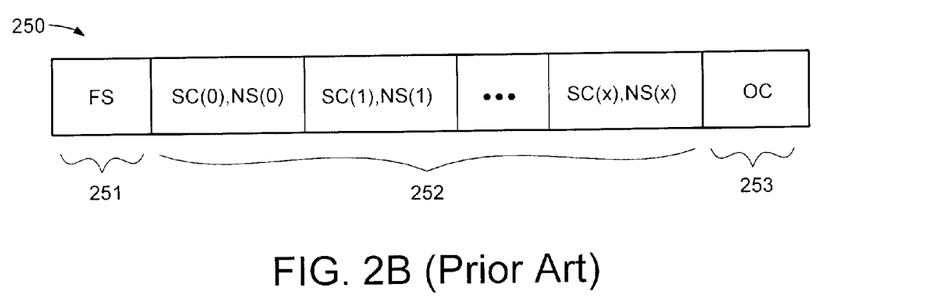
FIG. 2B shows an exemplary data format for the state entries of a typical state machine stored in the search engine of FIG. 2A.

FIG. 2B shows an exemplary state entry 250 that is illustrative of the format of the state entries stored in state memory 220 of FIG. 2A. State entry 250 includes a fail state (FS) field 251, a success transition field 252, and an output code (OC) field 253, and may be collectively represented as {FS; ST[0: x]; OC}. More specifically, the FS field 251 stores a single state value that indicates the fail state of the state represented by state entry 250, the ST field 252 stores one or more pairs of success characters (SC) and corresponding next state (NS) values, and the OC field 253 stores one or more output codes. For example, the state entry for state 1 of the goto-failure graph 100 of FIG. 1 may be represented as S1={0; e,2; i,6; 0}, where FS=0 indicates that the root state 0 is the fail state of state 1, ST[0]="e,2" indicates that state 1 includes an "e" success transition to a next state 2, ST[1]="i,6" indicates that state 1 includes an "i" success transition to a next state 6, and OC=0 indicates that state 1 does not include an output code.

Search logic 210 includes control logic 212 and compare logic 214. Control logic 212, which includes an input port to receive an input string from a network connection (not shown for simplicity) and an output port to provide search results to the network connection, controls search operations between the input string and the signatures embodied by the search tree stored as state entries in state memory 220. Compare logic 214, which is coupled to state memory 220 and to control logic 212, implements the string search operation using a DFA embodied by the search tree stored in state memory 220. Further, although not shown in FIG. 2A for simplicity, search logic 210 typically includes registers, logic, and/or other suitable circuitry for storing and incrementing an input cursor (C) that points to the current input character of the input string being searched.

For example, during search operations, compare logic 214 provides a current state (CS) value as an address to state memory 220, which in response thereto outputs a corresponding state entry to compare logic 214. Compare logic 214 then compares the current character (CC) extracted from the input string by control logic 212 (e.g., in response to the cursor values) to the success characters (SC) of the success transition fields in the retrieved state entry to determine the next state in the search tree. If the current character matches one of the state's success transitions, the corresponding next state (NS) value is read from the state entry, and the next state value is used as the new current state (CS) value to address and retrieve the corresponding next state entry from state memory 220. A cache memory 216 is typically provided to store the state entry for the root state so that the corresponding state entry is locally stored within compare logic 214 and can thus be quickly retrieved without accessing state memory 220. In this manner, edge failures to the root state do not require access to state memory 220, thereby eliminating RAM read latencies when the state machine fails to the root state. Other state entries (e.g., such as state entries that are frequently accessed by the search engine) may also be stored in cache memory 216.

Figure 3A:
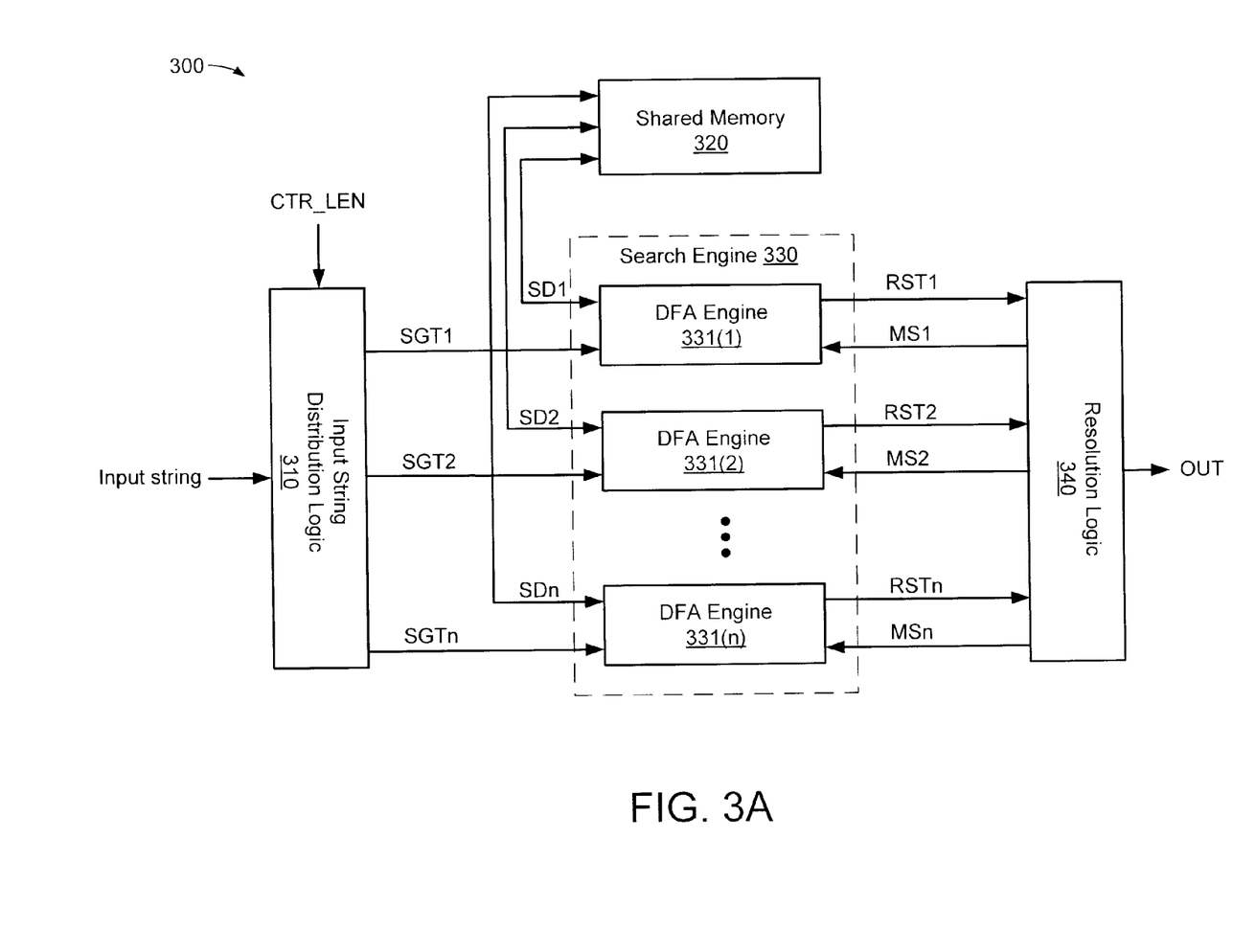
FIG. 3A shows a simplified functional block diagram of a content search system in accordance with some embodiments.

FIG. 3A shows a content search system 300 in accordance with some embodiments. Search system 300 includes input distribution logic 310, a shared memory device 320, a search engine 330 including a plurality of DFA engines 331(1)-331(n), and resolution logic 340. Input distribution logic 310, which includes an input to receive an input string of characters and a plurality of outputs each coupled to a corresponding DFA engine 331, is configured to divide the input string into a plurality of overlapping string segments and provide each of the string segments to a corresponding one of DFA engines 331. In accordance with present embodiments, adjacent string segments formed by input distribution logic 310 share an overlap region having a predetermined width (e.g., each overlap region includes a predetermined number of overlap characters). For some embodiments, the overlap region is defined to include between approximately 4 and 16 characters or bytes. For one embodiment, the width of the overlap region can be selected by an overlap region width control signal (CTR_LEN) provided to the input distribution logic 310.

Further, although not shown for simplicity, input distribution logic 310 includes a plurality of FIFO memory elements or buffers, each for storing the input string segment to be distributed to a corresponding one of the DFA engines 331. In this manner, the FIFO memory elements can buffer the incoming characters of the input string and provide the overlapping input string segments created by the input distribution logic 310 for simultaneous output to corresponding DFA engines 331. For other embodiments, the FIFO memory elements can be external to the input distribution logic 310 and located between the outputs of the input distribution logic 310 and the inputs of DFA engines 331.

The shared memory device 320 includes I/O ports coupled to each of the DFA engines 331, and is configured to store a plurality of state entries of a deterministic finite automaton (DFA) that embodies a number of signatures to be searched for in the input string. Shared memory device 320, which can be any suitable randomly addressable memory (RAM) device, is configured in a manner similar to that of state memory 220, except that shared memory device 320 can handle multiple read requests at the same time (e.g., from multiple DFA engines 331). Thus, for some embodiments, shared memory device 320 can be a multi-port memory device.

The DFA engines 331(1)-331(n) each have a first port to receive a corresponding one of the overlapping string segments from input distribution logic 310, each have a second port coupled to the shared memory device 320, each have a third port to provide match and state results (RST) to resolution logic 340, and include a fourth port to receive a corresponding master/slave (MS) signal from resolution logic 340. The DFA engines 331 are configured to compare their corresponding string segments with the patterns stored in shared memory device 320 in parallel using the AC algorithm, although other suitable algorithms can be used. For some embodiments, DFA engines 331 are similar to search logic 210 of FIG. 2A, except that DFA engines 331 are further configured to respond to the MS signals generated by resolution logic 340, as explained in more detail below. For other embodiments, the MS signals can be omitted, and the designation of each DFA engine 331 as either a master or slave device can be internal to resolution logic 340, in which case the DFA engines 331 can be conventional DFA engines such as search logic 210 of FIG. 2A.

Resolution logic 340 receives the match and state results RST from the DFA engines 331, and in response thereto, generates the MS signals and an output match signal OUT indicating whether one or more of the patterns are found in the input string. As explained in more detail below, resolution logic 340 uses the MS signals to select one of the DFA engines 331 as the master engine and to select the other DFA engines as slave engines, and resolves the match and state results generated by the DFA engines 331 to generate the output match signal OUT. Although not shown for simplicity, resolution logic 340 includes or is associated with a memory element that stores the states traversed by each of the DFA engines 331(1)-331(n) for each input character processed. For some embodiments, a character offset value is stored for each state traversed to indicate which character of the input string resulted in a transition to that state. For other embodiments, the match and state results (RST) provided to resolution logic 340 can include a tag signal that indicates whether the input character corresponding to the output match and state information is part of an overlap region, and the resolution logic 340 can use these tag bits to facilitate the designation of each DFA engine 331(1)-331(n) as either a master device or a slave device (e.g., when to transition the master device from one DFA engine to another DFA engine).

Figure 4A:
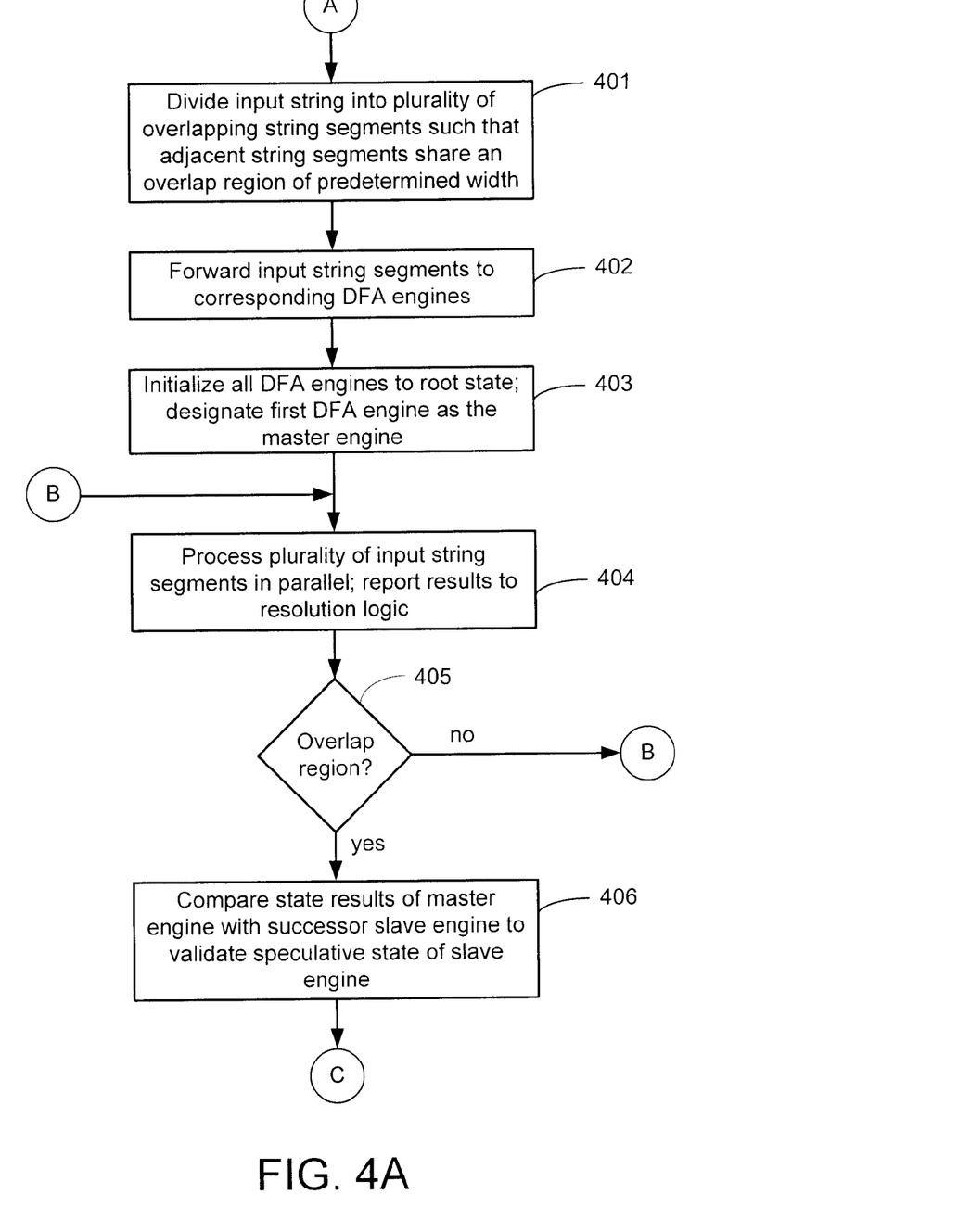
FIGS. 4A and 4B illustrate an exemplary search operation of the search system of FIG. 3A.

A general operation of search system 300 is described below with respect to the exemplary flow chart of FIG. 4. First, input distribution logic 310 divides the input string into a plurality of overlapping string segments in which adjacent string segments share an overlap region (401). As mentioned above, the overlap region shared by adjacent input string segments is of a predetermined size. More specifically, for some embodiments, the length of the overlap region is set to the length of the longest string embodied by the DFA that is stored in the shared memory device 320. In this manner, present embodiments can guarantee that validation of a successor slave engine is completed within the predetermined number of characters of the overlap region that is shared by the input string segments distributed to adjacent DFA engines 331.

Next, input distribution logic 310 forwards the overlapping string segments to corresponding DFA engines 331(1)-331(n) for simultaneous processing (402). The DFA engines 331 are all initialized to the root state of the DFA stored in the shared memory 320, and the first DFA engine is designated as the master engine by resolution logic 340 (403). For some embodiments, resolution logic 340 asserts (e.g., to logic high) the first master/slave signal MS1 and de-asserts (e.g., to logic low) all other master/slave signals MS2-MSn, thereby causing the first DFA engine 331(1) to be the master engine and causing the remaining DFA engines 331(2)-331(n) to be slave engines, respectively.

More specifically, because the first DFA engine processes the input characters that correspond to the beginning of the input string to be searched, only the first DFA engine is initially non-speculative. The remaining DFA engines begin operating on their corresponding string segments in a speculative manner at the root node. Thus, because the correct start state of the first DFA engine is known, the first DFA engine is initially designated as the master engine. Similarly, because the correct start states of the remaining DFA engines are not known, the remaining DFA engines are initially designated as slave engines whose match and state results can be later validated as the master engine begins processing characters in the overlap region of the input string segment.

Then, the DFA engines 331 begin processing their corresponding string segments in parallel and output the states reached to the resolution logic 340 for storage therein (404). More specifically, the DFA engines 331 retrieve DFA state data (SD) from the shared memory device 320 by providing current state values as address requests to the memory device 320, and then compare the current input character to the success characters of the state data retrieved from the shared memory device 320 to determine the next state of the DFA. Thereafter, the next state value is provided as the current state to address the next state entry of the DFA from the shared memory device 320, and processing continues on the string segments in a well-known manner (e.g., according to the AC algorithm). If any of the DFA engines reaches a match state of the DFA, the resolution logic 340 outputs the match condition.

Figure 4B:
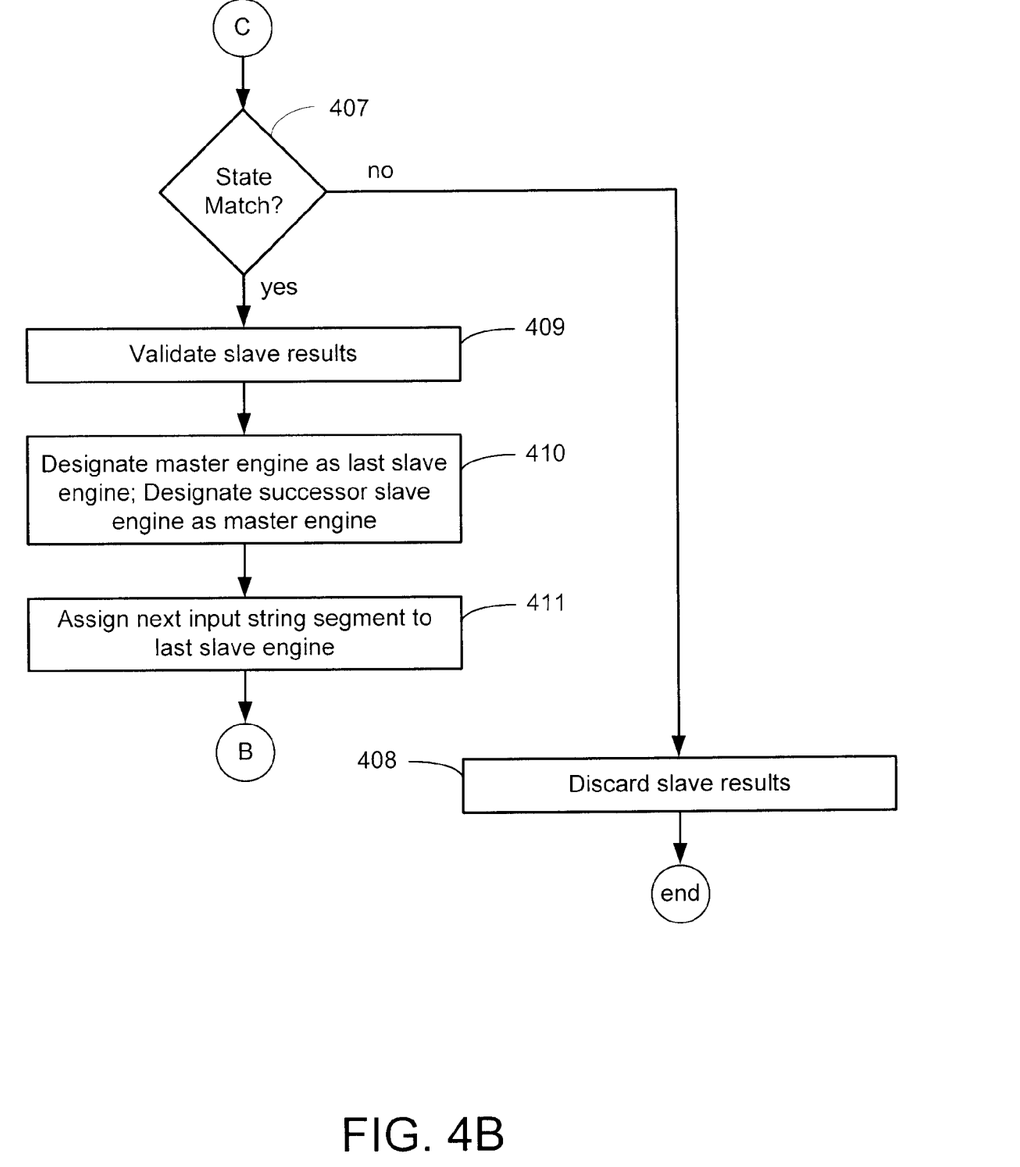

When the master engine begins processing characters in the overlap region shared by its input string segment and the input string segment processed by the adjacent successor slave engine, as tested at 405, the state results of the master engine are compared with the state results of the adjacent successor slave engine to validate the speculative state of the slave engine (406). More specifically, for each character in the overlap region processed by the master engine, the resolution logic 340 compares the state reached by the master engine with the state previously reached by the slave engine for the same character in the shared overlap region. For some embodiments, the resolution logic 340 can be enabled for comparing the state results of the master and successor slave engines in response to the master engine processing the first character in the overlap region, for example, by comparing the character offset value of the state traversed by the master engine with the character offset of the state previously traversed by the successor slave engine.

If the results of the master engine do not match the results of the successor slave engine before the master engine processes all the characters in the shared overlap region, as tested at 407, the results of the successor slave engine corresponding to the overlap region are discarded, and the slave engine takes over as the master engine (408). Note that for embodiments in which the overlap region is set equal to the length of the longest string stored in the shared memory, validation between the master and slave occurs by the end of the overlap region, thereby providing certainty about the number of cycles in which validation occurs.

Conversely, if the state results of the master engine match the state results of the successor slave engine before the master engine processes all the characters in the shared overlap region, as tested at 407, the results of the successor slave engine are validated (409). Because the results of the slave engine are validated and thus no longer speculative, the master engine is designated as the last slave engine, and the successor engine is designated as the new master engine (410). For some embodiments, the resolution logic 340 can provide an asserted stop signal (not shown for simplicity) to the master engine that instructs the master engine to not process any remaining characters of the overlap region. For other embodiments, the transitioning of the MS signal from an asserted state (indicating master status) to a de-asserted state (indicating slave status) can be used to stop the master engine. Thereafter, the input distribution logic 310 assigns the next input string segment to the last slave engine (411), and processing continues at 404. In this manner, the DFA engines 331 are sequentially designated as the master engine upon validation of the next engine, thereby forming an engine loop around which the master status rotates until the search operation is complete.

Thus, embodiments of search system 300 having a number N of DFA engines 331(1)-331(N) provides N degrees of parallelism using a single copy of the DFA stored in the shared memory device. It is noted that for most input strings, the resolution stage 340 can quickly resolve results between adjacent DFA engines because a small number of the DFA states typically account for most of the active states during search operations. For example, the root state is typically the most frequently visited state in the DFA because it is not only the start state but also the default fail state.

Further, by pipelining read requests from multiple DFA engines 331 to the shared memory device 320, memory latencies can be overlapped with search operations performed by the DFA engines 331, thereby improving performance as compared to search systems that use a single DFA engine.

Perhaps more importantly, embodiments of search system 300 can guarantee that adjacent DFA engines (e.g., the master engine and the successor slave engine) conclude validation in a predetermined number of cycles, thereby advantageously providing network engineers and administrators with predictable performance parameters. More specifically, as mentioned above, for some embodiments, the length of the overlap region is set to the length of the longest string embodied by the DFA that is stored in the shared memory device 320. As a result, present embodiments are able to guarantee that validation between adjacent DFA engines occurs upon completion of the designated master engine processing its corresponding input string segment, and therefore can also guarantee improvement in the worst case processing speeds. In contrast, the prior speculative matching technique proposed by Luchaup et al cannot guarantee how long validation between DFA engines may take, but rather allows a DFA engine to process a chunk assigned to and already processed by a second DFA engine until agreement between the two DFA engines is achieved.

Figure 5A:
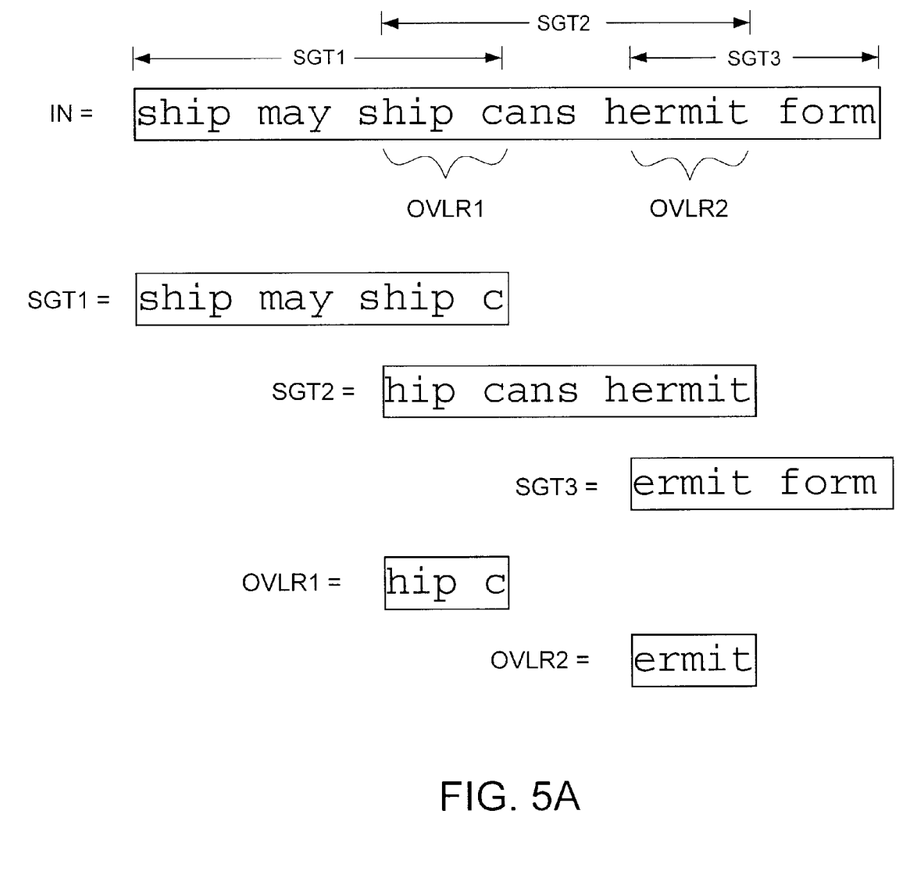
FIG. 5A depicts the division of an input string into a plurality of overlapping string segments according to some embodiments.

A more detailed description of a search operation for the patterns {he, she, his, hers} using an exemplary embodiment of search system 300 having 3 DFA engines 331(1)-331(3) is described below with respect to FIGS. 5A-5B. For the description below, the exemplary search system is configured to use the AC state machine of FIG. 1, for example, by storing the state entries of state machine 100 in its shared memory device 320. FIG. 5A illustrates input distribution logic 310 dividing an input string IN="ship may ship cans hermit form" into three string segments SGT1-SGT3, where the first string segment SGT1="ship may ship c", the second string segment SGT2="hip cans hermit", and the third string segment SGT3="ermit form". Adjacent segments SGT1 and SGT2 share a first 5-character overlap region OVLR1="hip c" and adjacent segments SGT2 and SGT3 share a second 5-character overlap region OVLR2="ermit". After input distribution logic 310 forwards SGT1, SGT2, and SGT3 to DFA engines 331(1), 331(2), and 331(3), respectively, the DFA engines begin to process their respective overlapping input string segments in parallel. For the exemplary illustration provided in FIG. 5A, the overlap region is set to 5 characters even though the longest string in the DFA is only 4 characters (e.g., {hers}) for ease of understanding. However, for actual embodiments in which an input string is searched for the patterns {he, she, his, hers}, the overlap region is set to 4 characters.

Figure 5B:
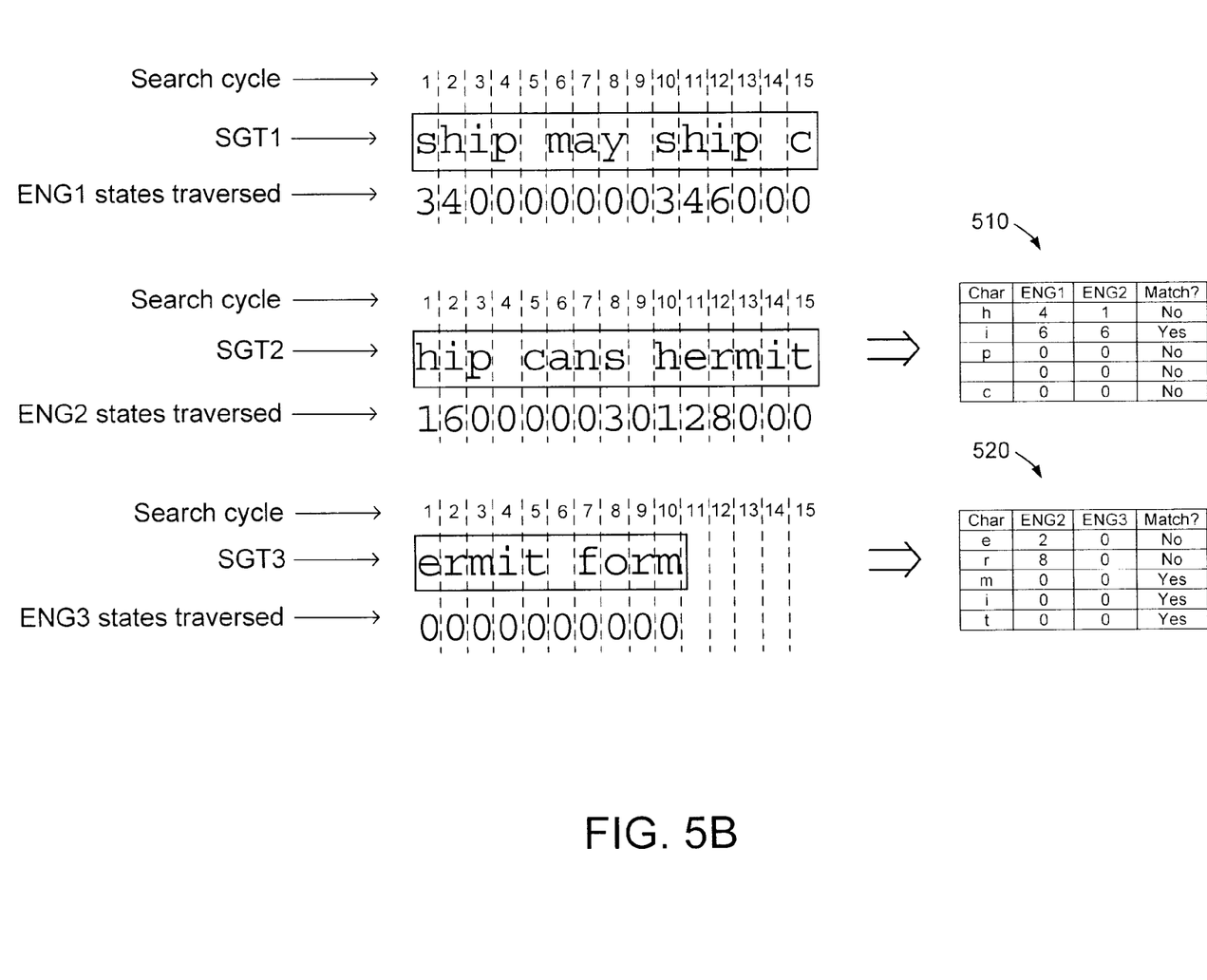
FIG. 5B illustrates a search operation on the overlapping input string segments depicted in FIG. 5A using some embodiments of the search system of FIG. 3A.

More specifically, FIG. 5B illustrates the states traversed by each of the DFA engines 331(1)-331(3) upon processing each character of their respective input string segments. For the description provided below, DFA engine 331(1) is referred to as ENG1, DFA engine 331(2) is referred to as ENG2, and DFA engine 331(3) is referred to as ENG3. Referring also to the state machine of FIG. 1, all engines are initialized to the root state 0, ENG1 is initially designated as the master engine, and ENG2-ENG3 are initially designated as slave engines. Further, the states traversed for each input character processed by each of the DFA engines are stored in a suitable memory element within or associated with resolution logic 340.

In the first search cycle, ENG1 processes the first input character of SGT1, which is an "s", and takes the "s" goto transition to state 3. Concurrently, ENG2 processes the first input character of SGT2, which is an "h", and takes the "h" goto transition to state 1, and ENG3 processes the first input character of SGT3, which is an "e", and takes the failure transition back to the root state 0.

In the second search cycle, ENG1 processes the second input character of SGT1, which is an "h", and takes the "h" goto transition to state 4; ENG2 processes the second input character of SGT2, which is an "i", and takes the "i" goto transition to state 6, and ENG3 processes the second input character of SGT3, which is an "r", and again takes the failure transition back to the root state 0.

In the third search cycle, ENG1 processes the third input character of SGT1, which is an "i", and takes the failure transition to the root state 0; ENG2 processes the third input character of SGT2, which is an "p", and takes the failure transition to root state 0, and ENG3 processes the third input character of SGT3, which is an "m", and again takes the failure transition back to the root state 0.

Processing continues in the manner described above until the $11^{th}$ search cycle, during which ENG1 begins processing characters of the first overlap region OVLR shared by input string segments SGT1-SGT2. Thereafter, for each character of the first overlap region OVLR1, resolution logic 340 compares the state reached by ENG1 with the state previously reached by ENG2 for the same character in the shared overlap region using suitable well-known comparison circuitry and techniques. For example, in the $11^{th}$ search cycle, ENG1 processes the "h" and transitions to state 4, and resolution logic 340 compares the ENG1=4 state value with the ENG2=1 state value reached in the $1^{st}$ search cycle. Since ENG1(h)=4 does not match ENG2(h)=1, resolution logic 340 records a mismatch condition between ENG1 and ENG2 for the first overlap character "h", as indicated in Table 510 of FIG. 5B. Then, in the $12^{th}$ search cycle, ENG1 processes the "i" and transitions to state 6, and resolution logic 340 compares the ENG1=6 state value with the ENG2=6 state value reached in the $2^{nd}$ search cycle. Since ENG1(i)=6 matches ENG2(i)=6, resolution logic 340 records a state match condition between ENG1 and ENG2 for the second overlap character "i", as indicated in Table 510 of FIG. 5B. The state match condition between ENG1 and ENG2 validates the search results of ENG2, which become non-speculative. In response thereto, resolution logic 340 designates ENG2 as the master engine, and designates ENG1 as a slave engine that will be a successor to slave engine ENG3. In addition, resolution logic 340 instructs ENG1 to not process any remaining characters of the overlap region OVLR1. Thereafter, input distribution logic 310 provides additional portions of the input string to ENG1. Thus, although FIG. 5B depicts ENG1 as processing input characters after the character "i" in the $12^{th}$ cycle, once ENG1 is relieved of its master designation, the remaining characters of SGT1 need not be processed by ENG1 because ENG2 has already processed these remaining characters, and a subsequent input string segment (e.g., after SGT3) can be provided to ENG1 by input distribution logic 310.

Then, in the $13^{th}$ search cycle, ENG2 (which is now the designated master device) processes the character "m" and transitions to state 0, and resolution logic 340 compares the ENG2=0 state value with the ENG3=0 state value reached in the $3^{rd}$ search cycle. Since ENG2(m)=0 matches ENG3(m)=0, resolution logic 340 records a state match condition between ENG2 and ENG3 for the overlap character "m" in OVLR2, as indicated in Table 520 of FIG. 5B. The state match condition between ENG2 and ENG3 validates the search results of ENG3, which become non-speculative. In response thereto, resolution logic 340 designates ENG3 as the master engine, and designates ENG2 as a slave engine that will be a successor to slave engine ENG1. In addition, resolution logic 340 instructs ENG2 to not process any remaining characters of the overlap region OVLR2. Thereafter, input distribution logic 310 can provide additional portions of the input string to ENG2.

For simplicity, the exemplary search operation described above with respect to FIGS. 5A-5B is depicted as having synchronous search cycles relative to the DFA engines ENG1-ENG3. However, for actual embodiments, the DFA engines ENG1-ENG3 may not process their respective input characters in a synchronous manner because the processing time for each input character can be different (e.g., because of read latencies associated with shared memory device 320, processing one or more failure pointers for the character, and so on).

Further, although not depicted in the exemplary search operation of FIGS. 5A-5B, if there is a state match between ENG2 and ENG3 while ENG1 is designated as the master engine, ENG2 can be paused because there is already validation between ENG2 and ENG3 (e.g., ENG3 has already processed the remaining characters of OVLR2). Thereafter, when the state results of ENG1 validate the speculative state results of ENG2, ENG3 can be designated as the new master device, and ENG1 and ENG2 become successor slave devices.

Thus, as explained above, the results of the master engine and the results of the successor slave engine begin to converge to achieve validation after the master engine begins processing characters in the overlap region shared by the adjacent input string segments assigned to the master engine and the successor slave engine. In addition, the ability to guarantee validation between the master engine and the successor slave engine within the overlap region before the search operation commences allows the input distribution logic 310 to divide the input string into predetermined-sized overlapping string segments and eliminates the need for additional hardware to facilitate the master engine going beyond the overlap region and processing an indefinite number of characters of the input string segment assigned to the successor slave engine, thereby reducing the size and simplifying the architecture of the search system, for example, as compared to the prior search system taught by Luchaup et al.

Figure 3B:
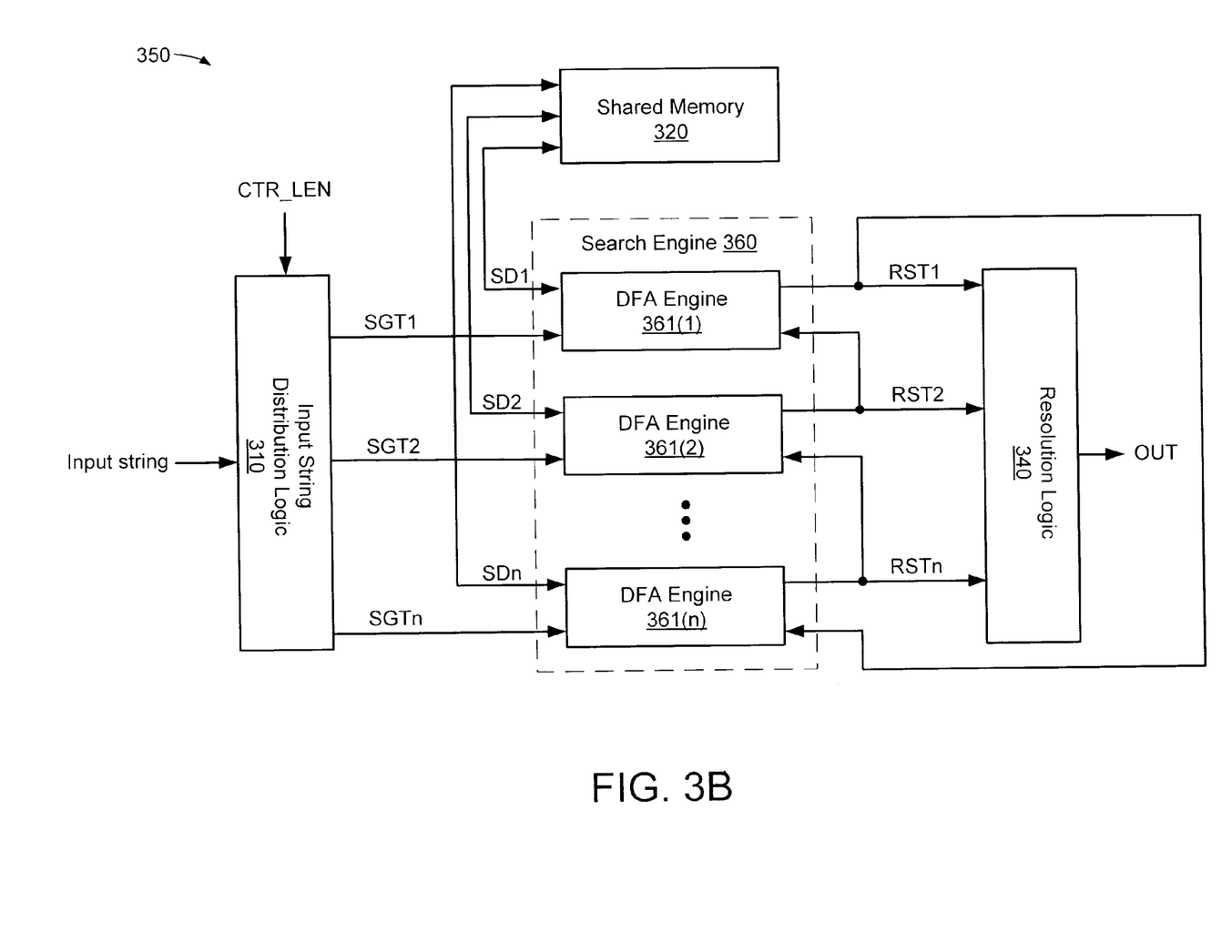
FIG. 3B shows a simplified functional block diagram of a content search system in accordance with other embodiments.

For the embodiments described above with respect to FIG. 3A, resolution logic 340 designates the DFA engines 331(1)-331(n) as either master or slave devices in response to comparison of state comparisons in the overlap region. For other embodiments, the DFA engines can include circuitry that performs this function. For example, FIG. 3B shows a search system 350 in accordance with other embodiments. Search system 350 is similar to search system 300 of FIG. 3A, except that its search engine 360 includes a plurality of DFA engines 361(1)-361(n) each of which includes circuitry (not shown for simplicity) that performs the designation of the engines as master or slave devices. More specifically, as depicted in FIG. 3B, the results (RST) of each DFA engine 361 are also provided as a feedback signal to the previous engine in the chain. In this manner, the state results for each slave device are provided to the previous engine in the chain so that when the master DFA engine 361 begins processing characters in the overlap region, the master engine can compare its traversed states with the states previously traversed by the successor slave engine to determine validation of the successor slave engine. The manner in which circuitry included within DFA engines 361 achieves this function is similar to that described above with respect to resolution logic 340.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A content search system for determining whether an input string matches one or more of a number of patterns, the content search system comprising:

a shared memory device for storing a plurality of state entries of a deterministic finite automaton (DFA) embodying the number of patterns;

input distribution logic having an input to receive the input string and configured to divide the input string into a plurality of string segments, wherein adjacent pairs of string segments of the plurality of string segments share a common overlap region having a predetermined number of characters equal to a number of characters in a longest one of the number of patterns, wherein the common overlap region is at an end of a first string segment and a beginning of a second string segment; and a plurality of DFA engines, each having a first input to receive the plurality of state entries from the shared memory device, having a second input to receive a corresponding one of the string segments of the plurality of string segments, and configured to compare characters of its corresponding input string segment with the number of patterns in parallel with other DFA engines of the plurality of DFA engines.

2. The content search system of claim 1, wherein each DFA engine of the plurality of DFA engines includes a third port to report match and state transition results taken in response to processing the characters of its corresponding input string segment.

3. The content search system of claim 2, further comprising:

resolution logic having an input to receive the state transition results reported by the plurality of DFA engines and configured to control operations of the plurality of DFA engines in response to comparisons between the state transition results reported by the plurality of DFA engines.

4. The content search system of claim 3, wherein a first of the plurality of DFA engines is initialized to operate as a master engine, and remaining DFA engines of the plurality of DFA engines are initialized to operate as slave engines, wherein match and state transition results of the slave engines are speculative.

5. The content search system of claim 3, wherein the resolution logic is further configured to combine match results generated by the plurality of DFA engines to generate an output match signal indicating whether the input string matches any of the number of patterns.

6. The content search system of claim 4, wherein the resolution logic is configured to compare state transition results of the master engine with state transition results of a successor slave engine only when the master engine begins processing characters in an overlap region shared by the input string segments provided to the master engine and the successor slave engine.

7. The content search system of claim 6, wherein the resolution logic designates the master engine as a new successor slave engine and designates the successor slave engine as a new master engine if there is a match condition for a comparison between the state transition results of the master engine and the state transition results of the successor slave engine.

8. The content search system of claim 7, wherein the resolution logic is configured to instruct the master engine to stop processing the characters in the overlap region in response to the match condition.

9. A content search system for determining whether an input string matches one or more of a number of patterns, the content search system comprising:

a shared memory device for storing a plurality of state entries of a deterministic finite automaton (DFA) embodying the number of patterns;

input distribution logic having an input to receive the input string and configured to divide the input string into a plurality of string segments, wherein adjacent pairs of string segments of the plurality of string segments share a common overlap region having a predetermined number of characters, wherein the common overlap region is at an end of a first string segment of the plurality of string segments and at a beginning of a second string segment of the plurality of string segments;

a plurality of DFA engines, each having a first input to receive the plurality of state entries from the shared memory device, having a second input to receive as an input string segment a corresponding one of the plurality of string segments, and configured to compare characters of the input string segment with one or more of the number of patterns in parallel with other DFA engines of the plurality of DFA engines to generate a state transition for each character; and resolution logic coupled to the plurality of DFA engines and configured to control operations of the plurality of DFA engines in response to comparisons between state transitions reported by the plurality of DFA engines.

10. The content search system of claim 9, wherein the predetermined number of characters in the overlap region is equal to a number of characters in a longest one of the number of patterns.

11. The content search system of claim 9, wherein a first of the plurality of DFA engines is initialized to operate as a master engine, and remaining DFA engines of the plurality of DFA engines are initialized to operate as slave engines, wherein match and state results of the slave engines are speculative.

12. The content search system of claim 11, wherein the resolution logic is enabled to compare state transitions of the master engine with state transitions of a successor slave engine only when the master engine begins processing characters in an overlap region shared by input string segments provided to the master engine and the successor slave engine.

13. The content search system of claim 12, wherein the resolution logic designates the master engine as a new successor slave engine and designates the successor slave engine as a new master engine if there is a match condition for a comparison between the state transitions of the master engine and the state transitions of the successor slave engine.

14. The content search system of claim 13, wherein the resolution logic instructs the master engine to stop processing characters in the overlap region in response to the match condition.

15. The content search system of claim 9, wherein the resolution logic is further configured to combine match results generated by the plurality of DFA engines to generate an output match signal indicating whether the input string matches any of the number of patterns.

16. A method performed by a content search system for determining whether an input string matches one or more of a number of patterns embodied by a plurality of state entries of deterministic finite automaton (DFA) stored in a shared memory device, comprising:

dividing the input string into a plurality of string segments, wherein adjacent pairs of string segments of the plurality of string segments share a common overlap region having a predetermined number of characters, and wherein the common overlap region is at an end of a first string segment of the plurality of string segments and at a beginning of a second string segment of the plurality of string segments;

forwarding each of the plurality of string segments to a corresponding DFA engine of a plurality of DFA engines;

comparing the plurality of string segments with the patterns in parallel using the plurality of DFA engines; and generating state results in each DFA engine of the plurality of DFA engines in response to the comparing.

17. The method of claim 16, wherein the predetermined number of characters in the overlap region is equal to a number of characters in a longest one of the number of patterns.

18. The method of claim 16, further comprising:

initializing all of the plurality of DFA engines to a root state of the DFA;

designating a first of the plurality of DFA engines as a master engine; and designating each of remaining DFA engines of the plurality of DFA engines as a slave engine.

19. The method of claim 18, further comprising:

comparing state results of the master engine with state results of a successor slave engine for corresponding characters in an overlap region shared by string segments of the plurality of string segments provided to the master and successor slave engine to generate a state match signal; and validating the state results of the successor slave engine if the state match signal indicates there is a match condition between the state results of the master engine and the successor slave engine.

20. The method of claim 19, further comprising:

if the state match signal indicates the match condition, designating the master engine as a new slave engine and designating the successor slave engine as a new master engine.

\* \* \* \* \*